Jan. 19, 1937. A. W. NORMAN 2,068,464
STRING BEAN SLICER
Filed April 22, 1936 2 Sheets-Sheet 1
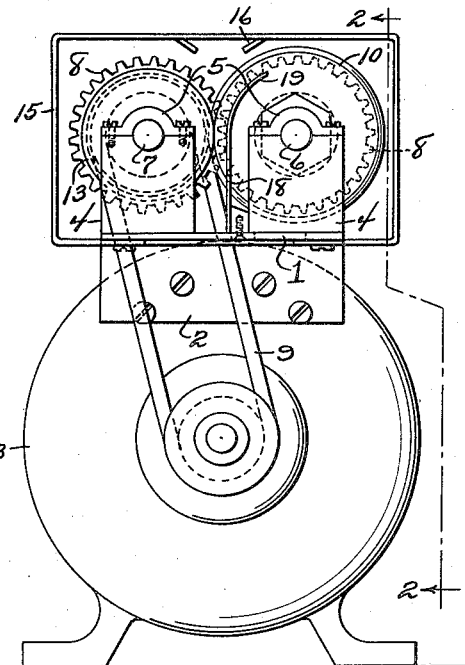
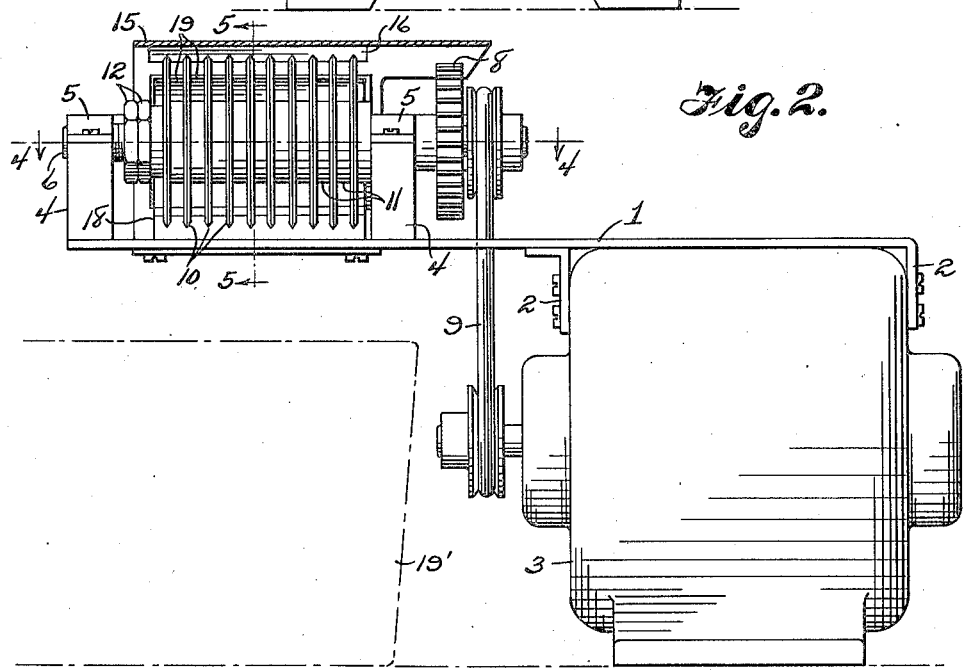
Arthur W. Norman INVENTOR
BY Victor J. Evans & Co.
ATTORNEYS

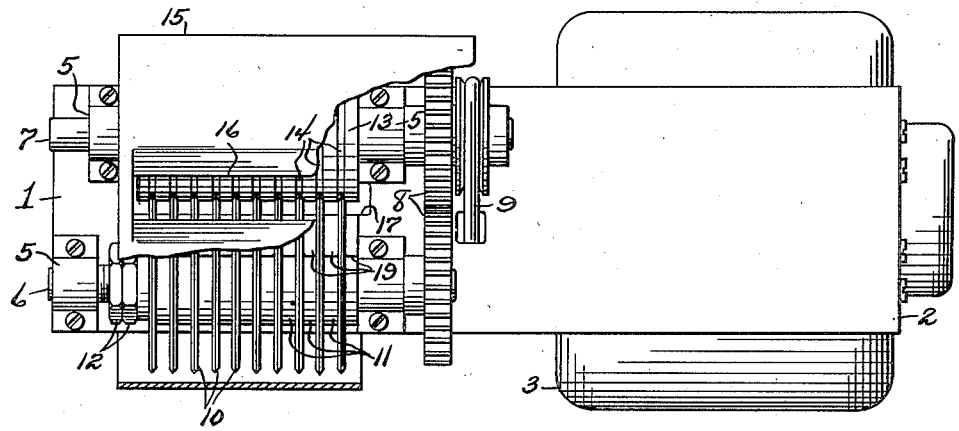
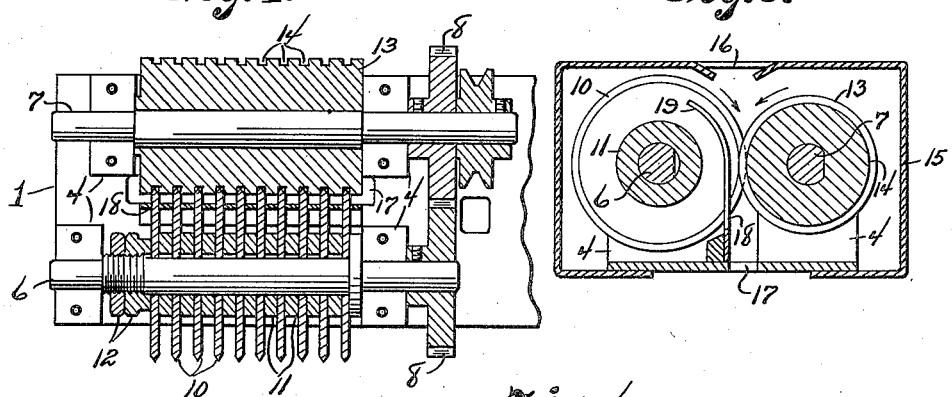
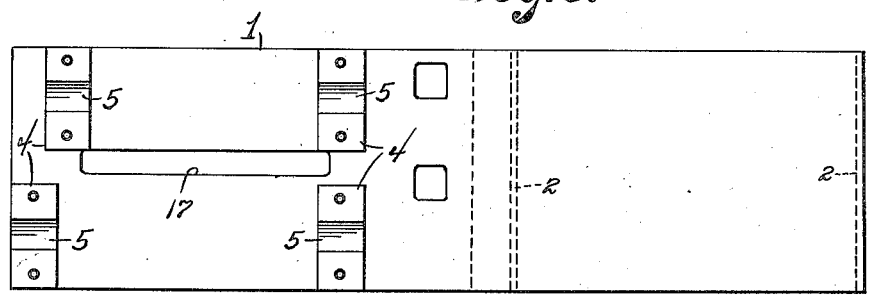

Patented Jan. 19, 1937

2,068,464

UNITED STATES PATENT OFFICE 2,068,464

STRING BEAN SLICER

Arthur W. Norman, Jersey City, N. J.

Application April 22, 1936, Serial No. 75,802

1 Claim. (Cl. 146—98)

This invention relates to string bean slicers, and has for the primary object the provision of a device of this character, which will efficiently and rapidly sever beans either endwise or diagonally into strips prior to cooking, so that when cooked the beans will be more tender and have an improved taste.

With these and other objects in view, this invention consists in certain novel features of construction, combination and arrangement of parts, to be hereinafter more fully described and claimed.

For a complete understanding of my invention, reference is to be had to the following description and accompanying drawings, in which Figure 1 is an end elevation illustrating a string bean slicer constructed in accordance with my invention.

Figure 2 is a sectional view taken on the line 2—2 of Figure 1.

Figure 3 is a top plan view, partly broken away, showing the cutting means for severing the beans.

Figure 4 is a sectional view taken on the line 4—4 of Figure 2.

Figure 5 is a transverse sectional view taken on the line 5—5 of Figure 2.

Figure 6 is a plan view illustrating the base of the device.

Referring in detail to the drawings, the numeral 1 indicates a base having depending portions 2 which may be bolted or otherwise secured to a housing of an electric motor 3 so that the base will be supported horizontally and with a portion thereof projecting beyond one end of the electric motor. Said portion of the base has formed thereon pairs of upstanding posts 4 equipped with journals 5 to rotatably support shafts 6 and 7. These shafts parallel one another and are connected by gears 8 whereby the rotation of one shaft in one direction will bring about a rotation of the other shaft in an opposite direction. The shaft 7 is belted to the armature shaft of the electric motor, as shown at 9.

Removably secured to the shaft 6 is a series of relatively spaced circular knives 10 spaced from each other by spacers 11. The knives and spacers are secured to the shaft 6 for rotation therewith and are retained assembled on the shaft by lock nuts 12 threaded to said shaft.

A drum 13 is secured to the shaft 7 and has formed in its periphery spaced annular grooves 14 to receive the cutting edges of the knives.

Carried by the base 1 and surrounding the knives and the drum is a casing 15 having a mouth 16 disposed directly above the space between the shafts and also is provided with an outlet opening 17. A deflecting guard plate 18 is mounted to the base and includes a series of spaced curved fingers 19 extending between the knives with the upper ends of the fingers directed laterally of one side of the mouth 16. Beans are fed to the knives by way of the mouth 16 and are severed from end to end with the severed portions of the beans gravitating from the casing by way of the opening 17 and may be caught by a receptacle 19' positioned under the base. The beans are fed to the knives endwise and are prevented from following the rotation of the knives by the fingers 19 of the guard 18. The peripheries of the knives are beveled to form cutting edges.

A device of this character being power driven will rapidly and efficiently sever beans into strips or diagonal sections. The machine is composed of a minimum number of parts easily dismantled for cleaning, replacing dull knives, or making repairs thereto.

The machine will slice beans or vegetables lengthwise by inserting the beans horizontally, or diagonally by inserting the beans at an angle.

While I have shown and described the preferred embodiment of my invention, it will be understood that minor changes in construction, combination and arrangement of parts may be made without departing from the spirit and scope of my invention as claimed.

Having described the invention, I claim:

A string bean slicer comprising an elongated base having a discharge slot, depending portions secured on said base and secured on opposite ends of an electric motor for supporting said base horizontally and with a portion thereof projecting beyond one end of the electric motor, rotatable cutters journaled on the base, a drum journaled on the base and having grooves to receive the cutters, means connecting the drum and cutters to the electric motor, a casing carried by the base and located over the cutters and drum and having a mouth positioned over the cutters and drum and in alignment with the discharge slot, and a guard secured to the base adjacent the slot and including spaced curved fingers projecting between the cutters and laterally of the mouth and drum.

ARTHUR WM. NORMAN.